Dec. 27, 1932. P. E. FENTON 1,892,236
HINGED PIN FASTENER
Filed July 16, 1931 2 Sheets-Sheet 1

Inventor
Paul E. Fenton
by
W. N. Suette
Attorney

Dec. 27, 1932.  P. E. FENTON  1,892,236
HINGED PIN FASTENER
Filed July 16, 1931  2 Sheets-Sheet 2
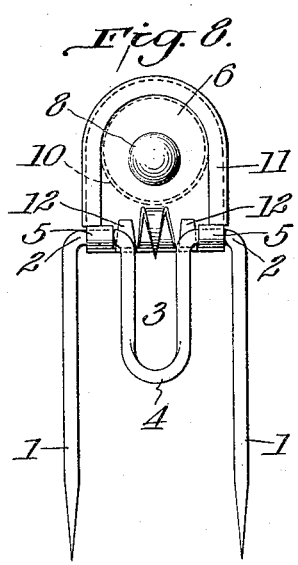
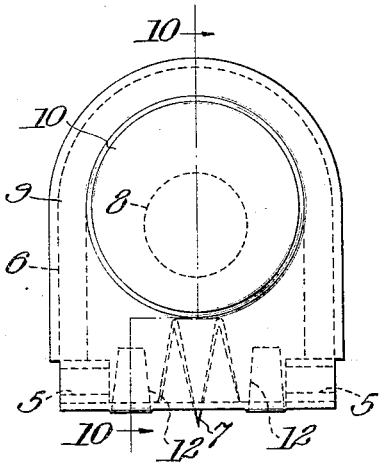
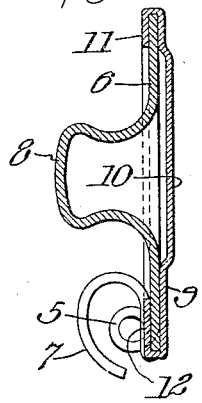
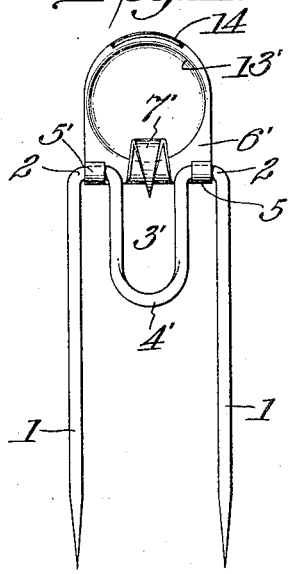
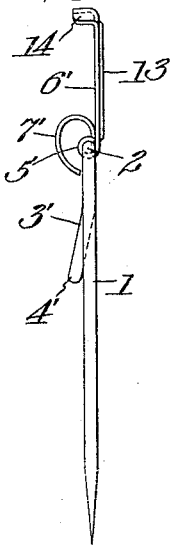
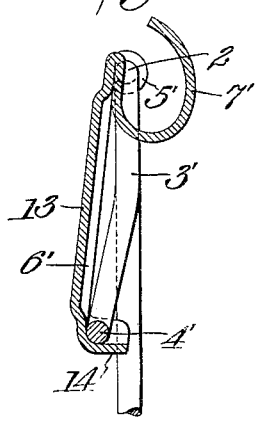
Inventor
Paul E. Fenton
by
Attorney Patented Dec. 27, 1932

1,892,236

UNITED STATES PATENT OFFICE

PAUL E. FENTON, OF THOMASTON, CONNECTICUT, ASSIGNOR TO SCOVILL MANUFACTURING COMPANY, OF WATERBURY, CONNECTICUT, A CORPORATION OF CONNECTICUT

HINGED PIN FASTENER

Application filed July 16, 1931. Serial No. 551,230.

This invention relates to pin fasteners, such as are used primarily for attaching slip covers to the upholstery of automobiles.

The object of the invention is to provide a pin fastener so formed and functioning that when inserted in the material of the parts to be fastened it may be locked therein and its accidental or inadvertent withdrawal or disengagement therefrom be prevented.

To this end, the invention contemplates a pin fastener including a double pronged pin having a cross bar connecting its prongs and formed with a relatively resilient loop, and a cap member hinged to the cross bar and provided with a prong and having a member engageable with the loop, the hinging of the cap relatively to the pin permitting the cap to be swung relatively to the pin so that its prong may be caused to pierce and be withdrawn from the material in which the pin is inserted to lock the pin in and release it from such material, respectively, and the member for engagement with said loop affording a means whereby the cap may be maintained in such position relatively to the pin that the prong will be held in piercing engagement with the material in which the pin is inserted, and the pin thus retained in inserted position, all as will be hereinafter more fully explained and finally claimed.

Figure 1:
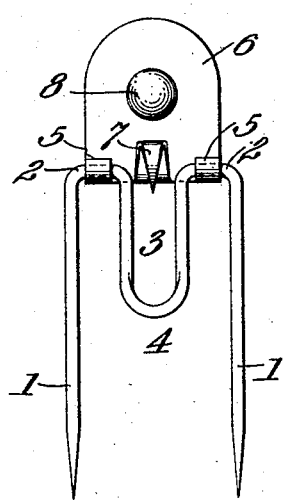
Figure 2:
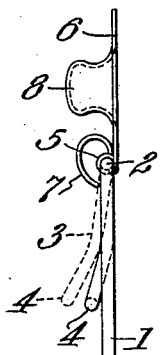
Figure 3:
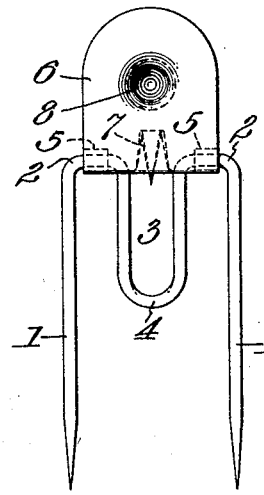
Figure 4:
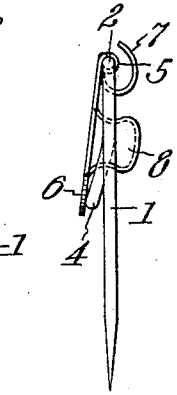
Figure 5:
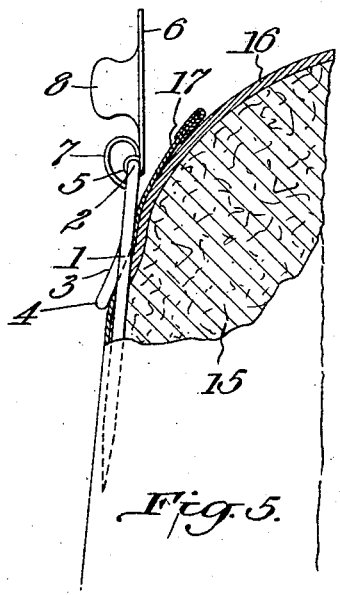
Figure 6:
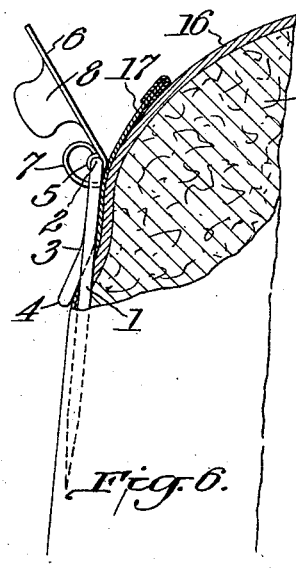
Figure 7:
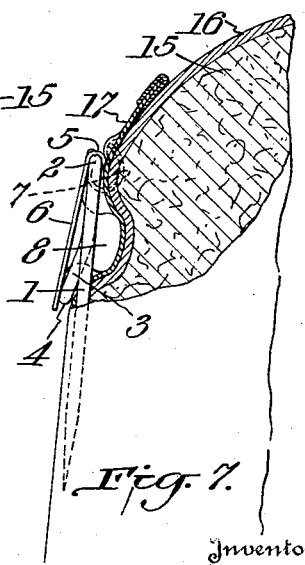

In the accompanying drawings illustrating the invention, in the several figures of which like parts are similarly designated, Figure 1 is a front elevation of a pin fastener embodying the characteristics of the invention and showing the hinged cap in what may be termed open position. Fig. 2 is a side elevation, and Fig. 3 is a rear elevation of the pin, with the parts thereof in the positions shown in Fig. 1. Fig. 4 is a side elevation of the pin with the hinged cap in what may be termed closed position. Figs. 5, 6 and 7 are fragmentary sectional side elevations illustrating the application of the pin fastener of the invention in use, Fig. 5 showing the pin partially inserted through a cover and into the upholstery, Fig. 6 showing the pin fully inserted and the cap partially rotated to closing position, and Fig. 7 showing the pin in the same inserted position as illustrated in Fig. 6 but with the hinged cap in fully closed position and its prong piercing the cover and upholstery material to maintain the pin in such inserted position. Fig. 8 is a view similar to Fig. 1 but illustrating a modification of the invention in which a cover member is applied to the hinged cap. Fig. 9 is an enlarged face view of the covered cap detached. Fig. 10 is a section taken on the line 10—10 of Fig. 9. Fig. 11 is a front elevation of a further modified form of the invention, the hinged cap being shown in open position. Fig. 12 is a side elevation of the pin as illustrated in Fig. 11. Fig. 13 is an enlarged fragmentary central sectional detail of the pin of Figs. 11 and 12 showing the hinged cap in closed position.

In all of the forms of the invention shown, the hinged pin fastener includes a pin having the two prongs 1 connected at their upper ends by a cross bar 2, the central portion of which is formed to provide a relatively resilient extension or loop 3 extending between the prongs 1 and preferably having its end 4 terminating short of the ends of the prongs 1 and bent or deflected out of the plane of the prongs 1, for a purpose hereinafter explained. By the formation of the relatively resilient extension or loop 3, it will be seen that the cross bar 2 is divided into two substantially axially aligned parts or hinge elements to which are applied the hinge members 5 of the hinged cap 6, the cap being thus retained upon the pin in such manner as to effectively prevent any appreciable lateral shifting relatively thereto. Carried by the cap 6, in such position relatively to the pivotal or hinged connection of the cap to the pin that it may effectively penetrate the material to which the pin is applied, is a pointed prong 7 of such curvilinear conformation as to pierce and be withdrawn from the material in response to the closing and opening movements of the cap respectively, with the greatest facility.

As shown in Figs. 1 to 10 inclusive, the hinged cap 6 is provided with a stud element or head 8 which, when the cap is closed, will snap between the relatively resilient arms of the loop 3 with a snap fastener stud and socket action to hold the cap closed and the prong 7 locked in position relatively to the pin.

As will be apparent from an inspection of Figs. 1 to 4 and 10, the stud element or head 8 is drawn up preferably from the material of the hinged cap 6, thus producing, upon that side of the cap which may be termed the face, a depression which is visible when the cap is in closed position. To some, this depression might seem unsightly, and in order that it may be concealed the cap may be provided with a cover member, as illustrated in Figs. 8 to 10. This cover member comprises, preferably, a plate 9 provided upon its face, if desired, with a boss 10 or other ornament and having a partially perimetral flange 11 and tabs 12 closed in over the edges of the cap to hold the cover fixed thereon. Obviously other means may be provided for suitably assembling the cap and cover member.

Instead of providing the hinged cap with a stud element or head for snap action or engagement with and between the relatively resilient arms of the loop 3, I may modify the construction of the cap as illustrated in Figs. 11 to 13.

In this modification of the invention, the cap 6' has the hinge members 5' applied to the portions 2 of the cross bar in the manner already described, and is provided with a prong 7' similar to and operating in the same manner as the prong 7. But the cap may be so treated as to form an ornamental boss 13, and is provided at its free edge with a lip 14 preferably slightly angularly arranged relatively to the cap, as clearly shown in Figs. 12 and 13, so that when the cap is swung to closed position, the lip 14 will snap under the end 4' of the loop 3' of the pin the cap being thus held in closed position, the loop 3' being so relatively shortened as to thus cooperate with the lip 14 of the cap.

From the foregoing, it will be seen that in all of the forms of the invention illustrated, the following characteristics are common, namely:—There is a double pronged pin provided with a relatively resilient loop, a cap hinged to the pin and provided with a prong adapted to pierce the material to which the pin is applied when the cap is swung to closed position, the cap being provided also with means adapted for snap action with the loop of the pin to hold the cap in closed position with the prong inserted in the material to which the pin is applied to thus prevent accidental or inadvertent withdrawal or disengagement of the pin from the material.

Referring now to Figs. 5 to 7, in which a typical application of the pin in use is illustrated, 15 indicates the upholstery stuffing of an automobile seat or the like, 16 the plush, velour or other covering material therefor, and 17 any appropriate slip cover.

As shown, the pin of the invention, with its cap 6 in open position, has its prongs 1 inserted through the slip cover 17 and covering 16 and into the upholstery 15 and is forced in as far as the cross bar 2 will permit. The resilient loop 3, having its end 4 outturned from the plane of the prongs 1, is guided and rides upon the outside of the slip cover, and due to resiliency of its connection at the cross bar, is capable of deflection, as shown in broken lines in Fig. 2, to accommodate materials of various thicknesses and to compensate for various angles at which the prongs may be inserted in the upholstery. After the pin has been thus inserted, the cap 6 is swung upon the hinge formed by the connections 5 with the cross bar 2 and its prong 7 is thus caused to progressively pierce and penetrate the slip cover 17 and the upholstery material 16, and whatever part of the stuffing 15 is encountered by it, the cover being finally closed to the position illustrated in Fig. 7 with its stud member 8 in snap action engagement with the relatively resilient loop 3. With the pin thus inserted, and its parts in this position, as illustrated in Fig. 7, it will be apparent that the pin cannot be withdrawn from the material to which it is applied until the cap has again been swung to open position, and that therefore accidental or inadvertent withdrawal of the pin is prevented.

Obviously, the operation, in use, of the modified forms of pin illustrated in Figs. 8 to 13 is essentially the same as that just described.

Various changes and modifications other than and in addition to those particularly referred to are contemplated as within the spirit of the invention and the scope of the following claims.

What I claim is:—

1. In a pin fastener, a double pronged pin having its prongs connected by a bar providing a hinge element, and a pronged cap hingedly connected with said bar, said bar provided intermediate the pin prongs with a resilient extension terminating short of the ends of said prongs, and said cap provided with means for detachably engaging said extension, whereby the prong of said cap may be locked in position relatively to said pin.

2. In a pin fastener, a double pronged pin having a cross bar connecting its prongs, said cross bar provided with a loop, a cap hinged to said cross bar intermediate said pin prongs and loop and provided with a prong extending into said loop, and a snap fastening element carried by said cap distinct from said prong and engageable with said loop to detachably lock said cap and its prong in fixed relation to said pin.

3. In a pin fastener, a double pronged pin having a cross bar extending between the prongs of the pin and provided with a loop, said loop deflected from the plane of said prongs, a cap hinged to said cross bar between said prongs and loop and having a prong engageable with the material to which the pin fastener is applied, said cap provided with a snap fastening element distinct from said prong and adapted for engagement with said loop to lock said cap and its prong in fixed relation to said pin and material, the deflected arrangement of said loop facilitating insertion of the pin fastener in the material.

4. In a pin fastener, a double pronged pin having a cross bar connecting said prongs, said cross bar provided with a relatively resilient loop terminating short of the ends of the pin prongs, a cap hinged to said cross bar and provided with a prong, and a stud element carried by said cap and engageable with said loop with a snap action to detachably fix said cap and its prong relatively to said pin.

5. In a pin fastener, a pin having two prongs and a connecting cross bar, said cross bar provided with a loop extending between the prongs of the pin and terminating short of the ends thereof and providing a pair of interconnected resilient arms, a cap hingedly connected with said cross bar and provided with a prong capable of penetrating the material to which the fastener is applied upon rotation of said cap upon its hinge connection, and a stud member carried by said cap and engageable with said arms with a snap fastener action to releasably lock said cap in closed position against said loop and the prong of said cap in penetrating relation to said material.

6. In a pin fastener, a pin having two prongs and a connecting cross bar, said cross bar provided with a loop extending between the prongs of the pin and terminating short of the ends thereof and providing a pair of interconnected resilient arms, a cap hingedly connected with said cross bar and provided with a prong arranged adjacent to the hinge of said cap and capable of penetrating the material to which the fastener is applied upon rotation of said cap upon its hinge connection, and a stud member carried by said cap and engageable with said arms with a snap fastener action to releasably lock said cap in closed position against said loop and the prong of said cap in penetrating relation to said material.

7. In a pin fastener, a pin provided with a resilient extension forming a separable fastener element, a cap hinged to said pin and provided with an integral fastener element complemental to said extension, said integral fastener element producing a depression in one surface of said cap, and a cover applied to said cap and covering said depression.

8. In a pin fastener, a pronged pin provided with a cross bar connecting the prongs, said cross bar having an extension lying intermediate said prongs, a cap hinged to said cross bar and provided with a prong adapted to pierce the material to which the fastener is applied, and a lip on said cap arranged for releasable engagement with said extension, whereby when said lip is engaged with said extension said cap will be locked in closed position with its prong fixed in said material to prevent withdrawal of the pin fastener.

9. In a pin fastener, a double pronged pin having a cross bar joining its prongs, said cross bar provided with a loop extending between said prongs, a cap hinged to said cross bar and provided with a prong adjacent to its hinge, and a lip on said cap arranged for separable engagement with the end of said loop, whereby when said pin fastener is inserted in material and said lip is engaged with said loop, the prong of the cap will penetrate said material and be locked in position relatively to the pin to prevent withdrawal of the pin fastener from the material.

In testimony whereof I have hereunto set my hand this 15th day of July A. D. 1931.

PAUL E. FENTON.